United States Patent
Takeshita et al.

(10) Patent No.: US 8,551,643 B2
(45) Date of Patent: Oct. 8, 2013

(54) BATTERY PACK

(75) Inventors: Toshio Takeshita, Kanagawa (JP); Mieko Hara, Tokyo (JP); Atsuhiro Kumagai, Kanagawa (JP); Yoichi Miyajima, Tokyo (JP); Shoichi Shintani, Saitama (JP)

(73) Assignee: Sony Corporation, Tokyo (JP)

( * ) Notice: Subject to any disclaimer, the term of this patent is extended or adjusted under 35 U.S.C. 154(b) by 432 days.

(21) Appl. No.: 12/661,685

(22) Filed: Mar. 22, 2010

(65) Prior Publication Data
US 2010/0248004 A1  Sep. 30, 2010

(30) Foreign Application Priority Data
Mar. 31, 2009  (JP) ................ P2009-088098

(51) Int. Cl.
*H01M 2/02* (2006.01)
*H01M 2/10* (2006.01)
*H01M 6/42* (2006.01)

(52) U.S. Cl.
USPC ............. 429/164; 429/100; 429/149

(58) Field of Classification Search
USPC ........................................ 429/164
See application file for complete search history.

(56) References Cited

U.S. PATENT DOCUMENTS

| | | | |
|---|---|---|---|
| 7,638,234 B2 | 12/2009 | Naito et al. | |
| 2003/0096160 A1* | 5/2003 | Sugiura et al. | 429/120 |
| 2007/0154801 A1* | 7/2007 | Hyung et al. | 429/180 |
| 2008/0286634 A1 | 11/2008 | Naito | |
| 2008/0286636 A1 | 11/2008 | Naito et al. | |
| 2008/0286637 A1 | 11/2008 | Yusa et al. | |
| 2008/0286638 A1 | 11/2008 | Naito | |
| 2008/0286639 A1 | 11/2008 | Yusa et al. | |
| 2008/0286640 A1 | 11/2008 | Naito | |
| 2008/0286641 A1 | 11/2008 | Yonishi | |
| 2008/0286647 A1 | 11/2008 | Naito | |
| 2009/0061302 A1* | 3/2009 | Scott et al. | 429/160 |

FOREIGN PATENT DOCUMENTS

JP  2008-287989 A  11/2008

* cited by examiner

*Primary Examiner* — Patrick Ryan
*Assistant Examiner* — Muhammad Siddiquee
(74) *Attorney, Agent, or Firm* — Sony Corporation

(57) ABSTRACT

A battery pack includes a battery housing, a battery cell having a tubular negative electrode having an opening part at one end and a positive electrode fixed to the negative electrode in such a way as to close the opening part, the battery cell being housed in the battery housing, and a protrusion disposed between the battery cell and the inner wall of the battery housing in an area other than an area where the positive electrode and the negative electrode of the battery cell are fixed.

7 Claims, 8 Drawing Sheets

BATTERY PACK

CROSS-REFERENCE TO RELATED APPLICATION

The present application claims priority from Japanese Patent Application No. JP 2009-088098 filed in the Japanese Patent Office on Mar. 31, 2009, the entire content of which is incorporated herein by reference.

BACKGROUND OF THE INVENTION

1. Field of the Invention

The present invention relates to a battery pack used as a power supply of an electronic apparatus such as an imaging device and, in particular, to a battery pack that can improve high impact resistance.

2. Description of the Related Art

In the related art, a battery pack is used as a portable power supply device in an electronic apparatus such as a personal computer or an imaging device. The battery pack is made up of a battery housing, a battery cell housed in the battery housing, a control circuit board, an output terminal, and the like.

Recently, a battery pack that can withstand an external impact from a fall and the like has been called for. For example, a technique of preventing a control circuit board from being damaged by an impact applied from the outside has been proposed (see Japanese Unexamined Patent Application Publication No. 2008-287989). The technique described in Japanese Unexamined Patent Application Publication No. 2008-287989 is as follows. A control circuit board is placed in a case supporting battery cells thereon. The case has rib-shaped supporting protrusions supporting the battery cells, whereby the battery cell and the control circuit board are placed with a gap therebetween. Accordingly, an impact to be exerted on the control circuit board is alleviated.

SUMMARY OF THE INVENTION

However, the technique described in Japanese Unexamined Patent Application Publication No. 2008-287989 can protect only the control circuit board from the external impact, while the battery cell is protected by the battery housing alone. Accordingly, when an excessive impact is applied to deform the battery housing, the impact may also be exerted on the battery cell, and the battery cell can be damaged. As a result, if the battery cell is damaged, it results in possible occurrence of a liquid leak or a short-circuit due to a contact between the positive and negative electrodes of the battery cell.

It is desirable to provide a battery pack that can protect a battery cell housed in a battery housing from an external impact caused, for example, by a fall.

According to an embodiment of the present invention, a battery pack includes a battery housing, a battery cell housed in the battery housing and having a tubular negative electrode having an opening part on one end and a positive electrode fixed to the negative electrode in such a way as to close the opening part, and a protrusion disposed between the battery cell and an inner wall of the battery housing in an area other than an area where the positive electrode and the negative electrode of the battery cell are fixed.

With the battery pack according to an embodiment of the present invention, it is possible to absorb an external impact by protrusions provided between the battery housing and the battery cell. This prevents the battery cell from causing a liquid leak due to the external impact, and makes it possible to prevent a short-circuit inside and outside the battery cell. Moreover, the protrusions provided between the above-described battery cell and the battery housing are disposed in an area other than an area where the positive electrode and the negative electrode of the battery cell are fixed. This makes it possible to prevent an impact from being exerted on an area, in the battery cell, where a short-circuit or a liquid leak is likely to occur.

BRIEF DESCRIPTION OF THE DRAWINGS

FIG. 1A is its perspective view as seen from the front side, and FIG. 1B is its perspective view as seen from the back side;

DESCRIPTION OF THE PREFERRED EMBODIMENTS

Figure 1A:
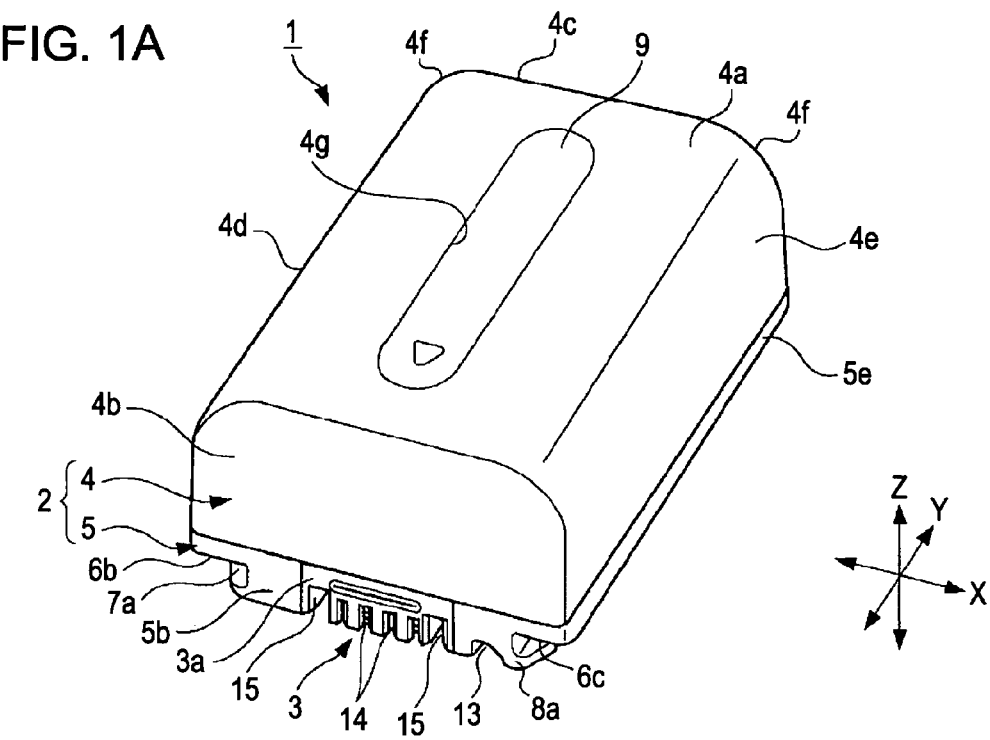
FIGS. 1A and 1B illustrate a battery pack according to an embodiment of the present invention.

Embodiments of the present invention of a battery pack will be described with reference to FIGS. 1A to 10, in the order indicated below. In these drawings, like component members are identified with like reference characters. However, the present invention is not limited to the embodiments described below:

<1. Battery pack according to An Embodiment>
[1-1. Battery Housing]
[1-2. Battery Cell]
[1-3. Partition Member]
[1-4. Assembly of the Battery pack]
<2. Battery pack according to Another Embodiment>
<1. Battery Pack According to an Embodiment>

First, a battery pack according to an embodiment (referred to below as the present embodiment) of the present invention will be described with reference to FIGS. 1A to 9.

Figure 1B:
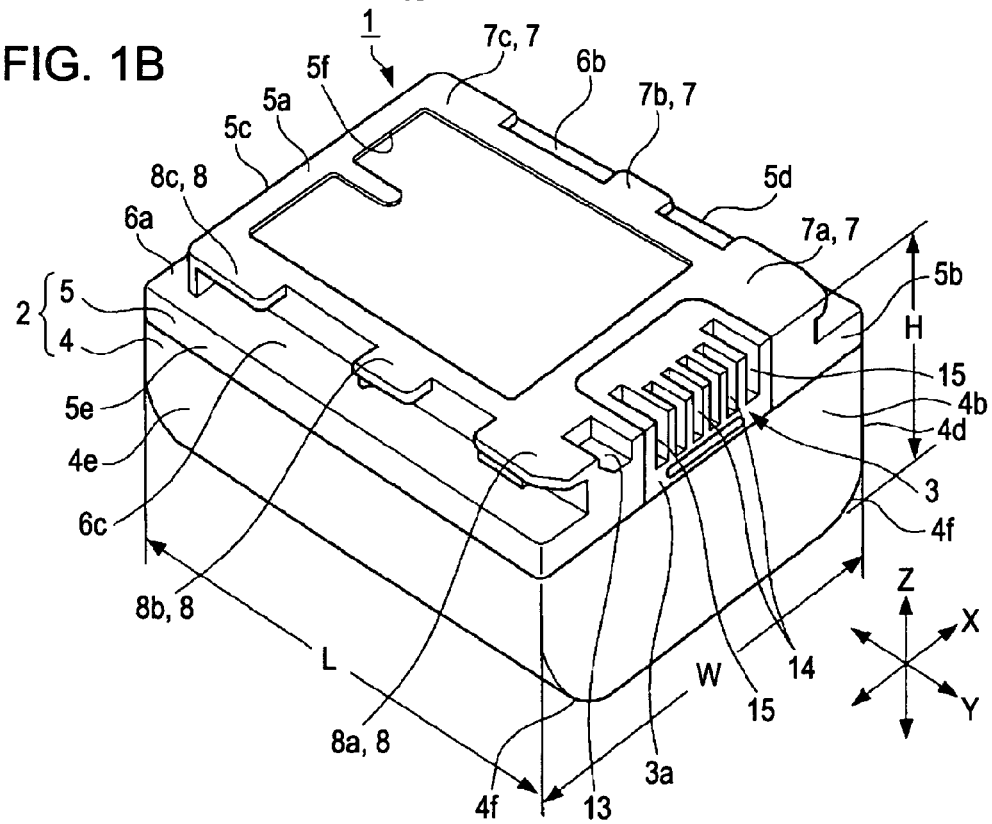
Figure 2:
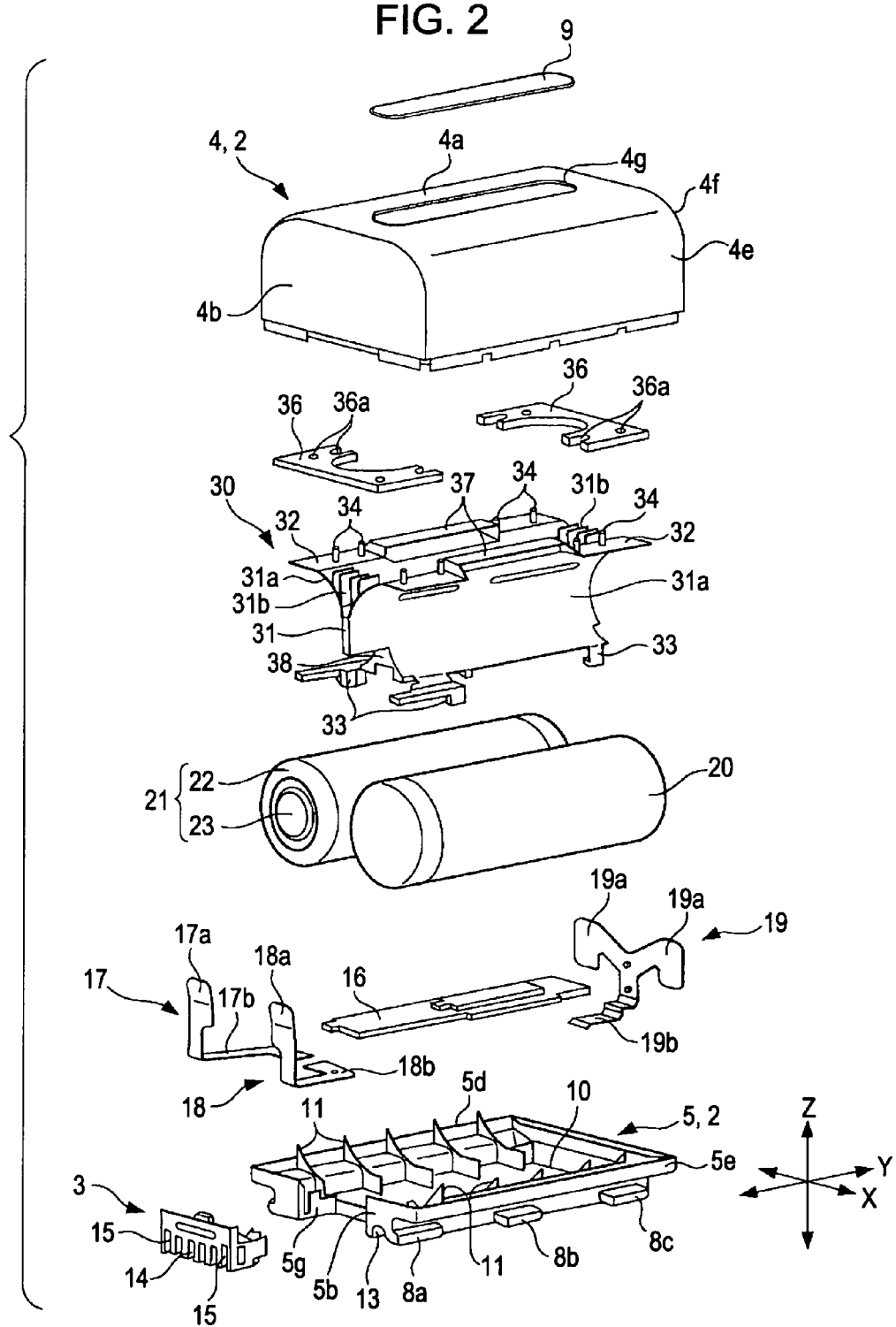
FIG. 2 is an exploded perspective view of the battery pack according to the embodiment of the present invention.
Figure 3:
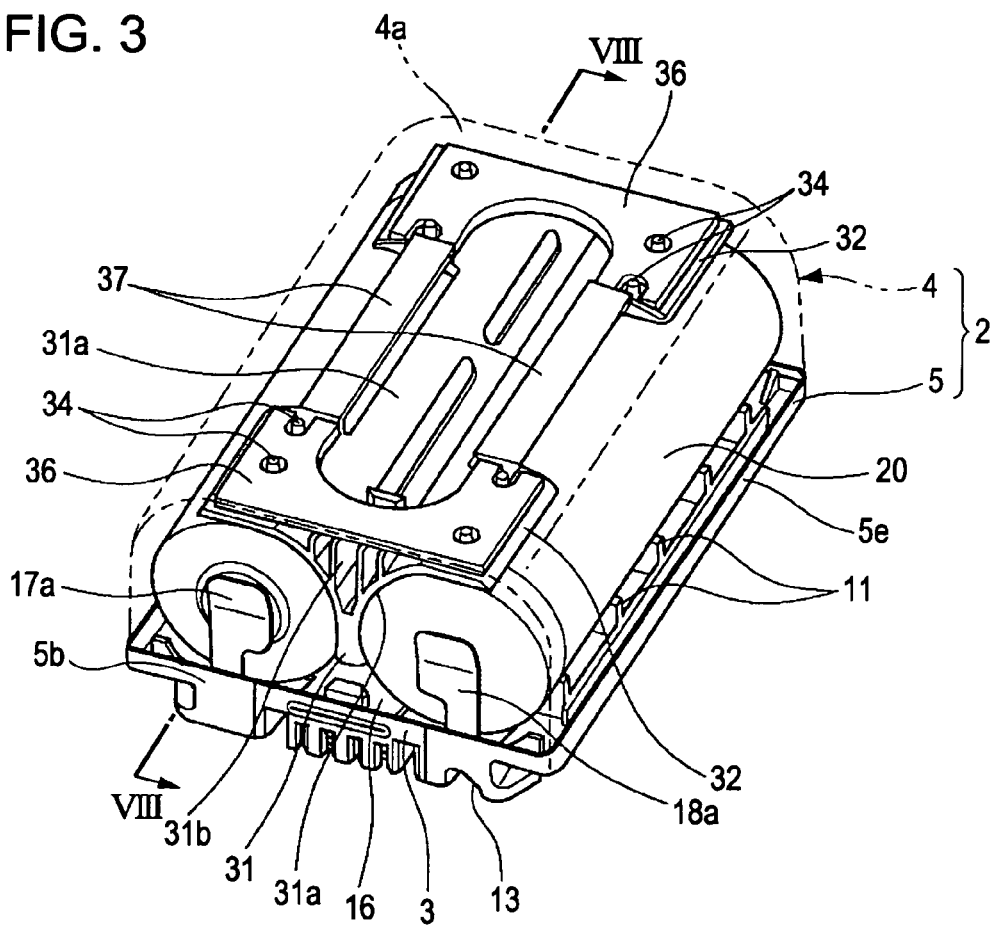
FIG. 3 is a perspective view when a first case of the battery pack according to the embodiment of the present invention is removed.

FIGS. 1A and 1B are perspective views showing the battery pack according to the present embodiment, and FIG. 2 is an exploded perspective view of the battery pack according to the present embodiment. FIG. 3 is a perspective view illustrating the interior of the battery pack according to the present embodiment.

A battery pack 1 according to the present embodiment is used as a portable power supply device in various types of electronic apparatuses such as an imaging device and a personal computer. As shown in FIGS. 1A to 3, the battery pack 1 includes a battery housing 2 formed as a hollow housing, an output terminal 3, two cylindrical battery cells 20, a control circuit board 16, and a partition member 30. As shown in FIG. 3, the two battery cells 20, the control circuit board 16, and the partition member 30 are housed in the battery housing 2.

[1-1. Battery Housing]

As shown in FIGS. 1A and 1B, the battery housing 2 is formed as a block-shaped container in the form of an approximately rectangular parallelepiped. The length of the battery housing 2 in the longitudinal direction Y is L, the width thereof in the width direction X orthogonal to the longitudinal direction Y is W, and the height thereof in the height direction Z orthogonal to the longitudinal direction Y and the width direction X is H. In addition, the dimensions (length L, width W, and height H) of the battery housing 2 are set such that length L>width W>height H holds.

However, the shape of the battery pack 1 is not limited to the above example. For example, the height H can be adequately increased (for example, width W<height H), the width W can be made longer than the length L (length L<width W), and other various dimensions can be applied.

The battery housing 2 is made up of a container-like first case 4 having an opening part on one face and a lid-like second case 5 attached to the first case 4 in such a way as to close the opening part of the first case 4.

First Case

The first case 4 has a top face part 4a having an approximately rectangular shape and a front face part 4b continuously formed almost perpendicularly from one side of the top face part 4a, the one side in the longitudinal direction Y. Moreover, the first case 4 has a back face part 4c continuously formed almost perpendicularly from the other side of the top face part 4a, the other side in the longitudinal direction Y. Furthermore, the first case 4 has a left side face part 4d continuously formed almost perpendicularly from one side of the top face part 4a, the one side in the width direction X, and a right side face part 4e continuously formed almost perpendicularly from the other side of the top face part 4a, the other side in the width direction X.

At a corner of the top face part 4a and the left side face part 4d and a corner of the top face part 4a and the right side face part 4e, arc-shaped chamfered parts 4f with a large radius of curvature are provided. Furthermore, substantially in the center of the top face part 4a, a concave part 4g into which an instruction panel 9 is fitted is provided (see FIG. 2), the instruction panel 9 for indicating a face of the battery pack 1 where the output terminal 3 is provided.

Second Case

The second case 5 has a lower face part 5a having an approximately rectangular shape and a front face part 5b continuously formed almost perpendicularly from one side of the lower face part 5a, the one side in the longitudinal direction Y. Moreover, the second case 5 has a back face part 5c continuously formed almost perpendicularly from the other side of the lower face part 5a, the other side in the longitudinal direction Y. Furthermore, the second case 5 has a left step part 5d provided on one side of the lower face part 5a in the width direction X and a right step part 5e provided on the other side of the lower face part 5a in the width direction X.

The back face part 5c has a first step face 6a continuously formed from the lower face part 5a with a predetermined difference in height. Moreover, the left step part 5d has a second step face 6b continuously formed from the lower face part 5a with a predetermined difference in height, and the right step part 5e has a third step face 6c continuously formed from the lower face part 5a with a predetermined difference in height. Furthermore, on one face of the lower face part 5a of the second case 5, an affixation concave part 5f to which a label is to be affixed is formed so as to have an appropriate depth.

The first step face 6a, the second step face 6b, and the third step face 6c are set so as to have the same length from the lower face part 5a in the height direction Z. Moreover, the second step face 6b and the third step face 6c are set so as to have almost the same length in the width direction X. In addition, the second step face 6b and the third step face 6c are formed almost parallel to the lower face part 5a.

The second case 5 is provided with a first engaging part 7 and a second engaging part 8 which protrude from both sides of the lower face part 5a, the sides in the width direction X, and have predetermined length and thickness. The first engaging part 7 and the second engaging part 8 are formed in a symmetrical shape.

The first engaging part 7 has three engaging pieces 7a to 7c formed along the longitudinal direction Y at predetermined intervals. The first engaging piece 7a is disposed on the front face part 5b side, and the third engaging piece 7c is disposed on the back face part 5c side. In addition, between the first engaging piece 7a and the third engaging piece 7c, the second engaging piece 7b is disposed. The length of the three engaging pieces 7a to 7c of the first engaging part 7, the length in the width direction X, is set as appropriate according to the type of the battery pack 1, such as the shape or power capacity thereof.

Similarly, the second engaging part 8 has three engaging pieces 8a to 8c formed along the longitudinal direction Y at predetermined intervals. The first engaging piece 8a is disposed on the front face part 5b side, and the third engaging piece 8c is disposed on the back face part 5c side. In addition, between the first engaging piece 8a and the third engaging piece 8c, the second engaging piece 8b is disposed. As is the case with the first engaging part 7, the length of the three engaging pieces 8a to 8c of the second engaging part 8, the length in the width direction X, is set as appropriate according to the type of the battery pack 1.

The first engaging part 7 and the second engaging part 8 engage a hook part provided in an attachment part of an electronic apparatus to which the battery pack 1 is attached. Specifically, hook pieces of the hook part of the electronic apparatus fit in spaces between the three engaging pieces 7a to 7c of the first engaging part 7 and spaces between the three engaging pieces 8a to 8c of the second engaging part 8. Then, the hook pieces of the electronic apparatus engage the three engaging pieces 7a to 7c of the first engaging part 7 and the three engaging pieces 8a to 8c of the second engaging part 8.

As shown in FIG. 2, the second case 5 has a mounting part 10 formed with the lower face part 5a, the front face part 5b, the back face part 5c, the left step part 5d, and the right step part 5e, the mounting part 10 on which the partition member 30 and the control circuit board 16 are mounted. The mounting part 10 is provided with a plurality of supporting parts 11 supporting the battery cells 20. The supporting parts 11 are provided on both sides of the lower face part 5a, the sides in the width direction X, and are formed along the longitudinal direction Y at predetermined intervals. In addition, the plurality of supporting parts 11 each have an arc-shaped face which comes into contact with the battery cell 20.

On the front face part 5b side of the second case 5, an opening part 5g for making part of the output terminal 3 exposed is provided. The opening part 5g is formed by continuously cutting a portion from the front face part 5b to the lower face part 5a. The opening part 5g is provided substantially in the center of the front face part 5b. Moreover, on one side of the opening part 5g in the width direction X, an identification concave part 13 for identifying the type of the battery pack 1 is provided. The identification concave part 13 is formed in a specific shape depending on the type of the battery pack 1, such as the shape or power capacity thereof.

As the material of the first case 4 and the second case 5 having the structures described above, engineering plastics, for example, can be used.

Output Terminal

As shown in FIG. 2, the output terminal 3 is formed in the shape of a block. The output terminal 3 is provided with a plurality of (in the present embodiment, four) electrode slits 14, inside which electrodes are placed, and with two positioning slits 15 disposed at both ends of the plurality of electrode slits 14.

The electrode slits 14 and the positioning slits 15 are formed as continuous groove-shaped cuts leading from a front face part 3a to a bottom face part 3b at a corner of the output terminal 3. The output terminal 3 is attached to the opening part 5g of the second case 5 in such a way that the front face part 3a thereof is flush with the front face part 5b of the second case 5 and the bottom face part 3b is flush with the lower face part 5a of the second case 5.

Positioning protrusions provided in the attachment part of the electronic apparatus to which the battery pack 1 is attached engage the two positioning slits 15 of the output terminal 3. Moreover, electrodes of a connecting terminal provided in the attachment part of the electronic apparatus engage the four electrode slits 14.

In this way, the output terminal 3 is detachably connected to various types of electronic apparatuses (for example, a personal computer and an imaging device) which are external devices. As a result of this connection, power of the battery pack 1 is supplied to the electronic apparatus to which the battery pack 1 is connected, and the battery pack 1 can transmit predetermined information (for example, a remaining battery level and characteristics thereof) to the electronic apparatus by data communication.

Moreover, battery-side electrodes are placed inside the four electrode slits 14 of the output terminal 3. The battery-side electrodes are electrically connected to the control circuit board 16. On the control circuit board 16, protection circuits and the like including a temperature protection element such as a fuse or a thermistor, a charge and discharge control FET1, and an IC monitoring the battery pack 1 and controlling the charge and discharge control FET1 are mounted. In addition, to the control circuit board 16, thin plate-shaped three electrode plates 17, 18, and 19 are electrically connected.

The first electrode plate 17 and the second electrode plate 18 are each formed substantially in the shape of the letter L and are formed in a symmetrical shape. The first electrode plate 17 has a first electrode piece 17a coming into contact with one end face of the battery cell 20 in the axial direction and a second electrode piece 17b electrically connected to the control circuit board 16. As is the case with the first electrode plate 17, the second electrode plate 18 has a first electrode piece 18a coming into contact with one end face of the battery cell 20 in the axial direction and a second electrode piece 18b electrically connected to the control circuit board 16.

The third electrode plate 19 is formed substantially in the shape of the letter Y, and is disposed to the side of the battery cell 20 opposite from the first electrode plate 17 and the second electrode plate 18. The third electrode plate 19 has two first electrode pieces 19a coming into contact with the other end faces of the two battery cells 20 in the axial direction and a second electrode piece 19b connected to the control circuit board 16. The second electrode piece 19b is continuously formed almost perpendicularly from the two first electrode pieces 19a.

The three electrode plates 17, 18, and 19 are formed of, for example, nickel (Ni), an alloy of copper, or nickel-plated copper.

[1-2. Battery Cell]

Figure 4:
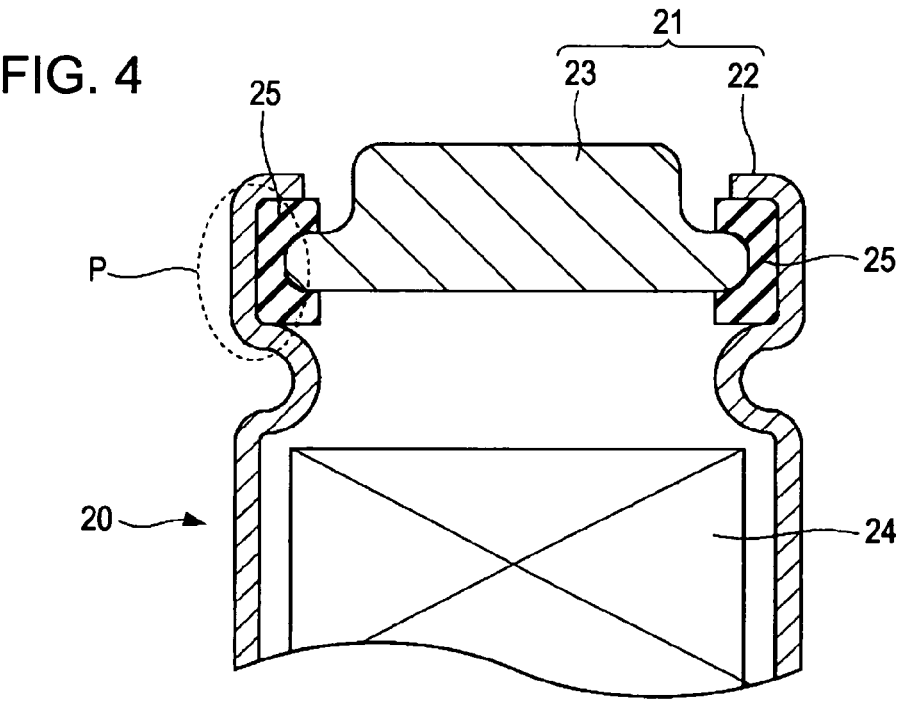
FIG. 4 is a sectional view showing a principal portion of a battery cell of the battery pack according to the embodiment of the present invention.

Next, with reference to FIG. 4, the battery cell 20 housed in the battery housing 2 will be described. FIG. 4 is an explanatory diagram showing the cross-section of a principal portion of the battery cell 20.

As shown in FIG. 4, the battery cell 20 includes a cell housing 21 in the form of a hollow cylinder and a cell element 24 housed in the cell housing 21.

Cell Housing

The cell housing 21 is made up of a cell can 22 in the form of a hollow cylinder and having an opening part 22a on one side and a cell lid 23 attached to the cell can 22 in such a way as to close the opening part 22a. Moreover, the entire external surface of the cell housing 21 other than both end faces thereof in the axial direction is covered with an insulating film. In the present embodiment, the shape of the cell housing 21 is described as being a cylindrical shape; however, the shape of the cell housing 21 is not limited to this specific shape. The cell housing 21 may have a prismatic shape such as a rectangular parallelepiped shape, a hexagonal shape, or an octagonal shape.

The cell can 22 is formed of, for example, nickel (Ni)-plated iron (Fe) as a cylindrical hollow body having an opening part 22a in one end face. A closed part located on the side of the cell can 22 opposite from the opening part 22a is electrically connected to a negative electrode of the cell element 24. In this way, the cell can 22 is configured as a negative electrode part.

The cell lid 23 substantially in the shape of a disk is attached to the opening part 22a of the cell can 22 by being squeezed thereinto with a gasket 25 placed in between. In this way, the opening part 22a of the cell can 22 is closed with the cell lid 23. The gasket 25 is formed of an insulating material, for example, and has a surface to which asphalt is applied.

Inside the cell lid 23, unillustrated safety valve mechanism and heat-sensitive resistance element are provided. The safety valve mechanism cuts off electrical connection between the cell lid 23 and the cell element 24 when the internal pressure of the cell becomes equal to or higher than a certain level due to an internal short-circuit or heating from outside, for example. The heat-sensitive resistance element limits the current by increasing a resistance value when the temperature rises, and thereby prevents abnormal heat generation due to high current.

The cell lid 23 is formed of nickel-plated iron (Fe), for example, as is the case with the cell can 22, and is formed as a circular lid body. In addition, the cell lid 23 is electrically connected to a positive electrode of the cell element 24. In this way, the cell lid 23 is configured as a positive electrode part.

Cell Element

The cell element 24 is formed by stacking a strip-shaped positive electrode and a strip-shaped negative electrode with a separator placed in between and then winding the stacked product thus obtained. A center pin formed of stainless steel or the like is inserted into the cell element 24 in the center thereof. To the positive electrode of the cell element 24, a positive electrode lead formed of aluminum (Al) or the like is connected, and, to the negative electrode thereof, a negative electrode lead formed of nickel or the like is connected.

The positive electrode lead is electrically connected to the cell lid 23 by being welded to the safety valve mechanism. In addition, the negative electrode lead is electrically connected to the cell can 22 by being welded to the closed part of the cell can 22.

The positive electrode is made up of a positive-electrode active material layer containing a positive-electrode active material and a positive-electrode current collector. The positive-electrode active material layer is formed on both sides of the positive-electrode current collector. Moreover, the positive-electrode active material layer contains, for example, a positive-electrode active material, a conductive agent, and a bonding agent. The positive-electrode current collector is made of metal foil such as aluminum (Al) foil, nickel (Ni) foil, or stainless (SUS) foil.

The negative electrode is made up of a negative-electrode active material layer containing a negative-electrode active material and a negative-electrode current collector. The negative-electrode active material layer is formed on both sides of the negative-electrode current collector. Moreover, the negative-electrode active material layer contains, for example, a negative-electrode active material, a conductive agent, and a bonding agent. The negative-electrode current collector is made of metal foil such as copper (Cu) foil, nickel (Ni) foil, or stainless (SUS) foil.

Moreover, the separator is made of a porous film formed of a polyolefin-based material such as polypropylene (PP) or polyethylene (PE), or a porous film formed of an inorganic material such as a ceramic nonwoven fabric. The separator may have a structure in which these two or more types of porous films are stacked. In particular, it is preferable that the separator be made of a porous film formed of polyethylene or polypropylene.

Furthermore, in the present embodiment, an example in which the negative electrode of the cell element 24 is connected to the cell can 22 and the positive electrode is connected to the cell lid 23 has been described; however, the embodiment of the present invention is not limited to such an example. For example, the negative electrode of the cell element 24 may be connected to the cell lid 23 such that the cell lid 23 serves as a negative electrode part, and the positive electrode may be connected to the cell can 22 such that the cell can 22 serves as a positive electrode part. Moreover, an example in which the cell lid 23 is fixed to the cell can 22 by being squeezed thereinto has been described; however, the embodiment of the present invention is not limited to such an example. For example, the cell lid 23 may be fixed to the cell can 22 by other fixing methods such as welding or crimping with the gasket 25 placed in between.

As shown in FIG. 3, the two battery cells 20 having the structure described above are housed in the battery housing 2 with the axes thereof arranged almost parallel to the longitudinal direction Y in a state in which the battery cells 20 are aligned along the width direction X orthogonal to the axes. The space between the two battery cells 20 is partitioned by the partition member 30.

[1-3. Partition Member]

Next, with reference to FIGS. 5 to 8, the partition member 30 according to the present embodiment will be described.

Figure 5:
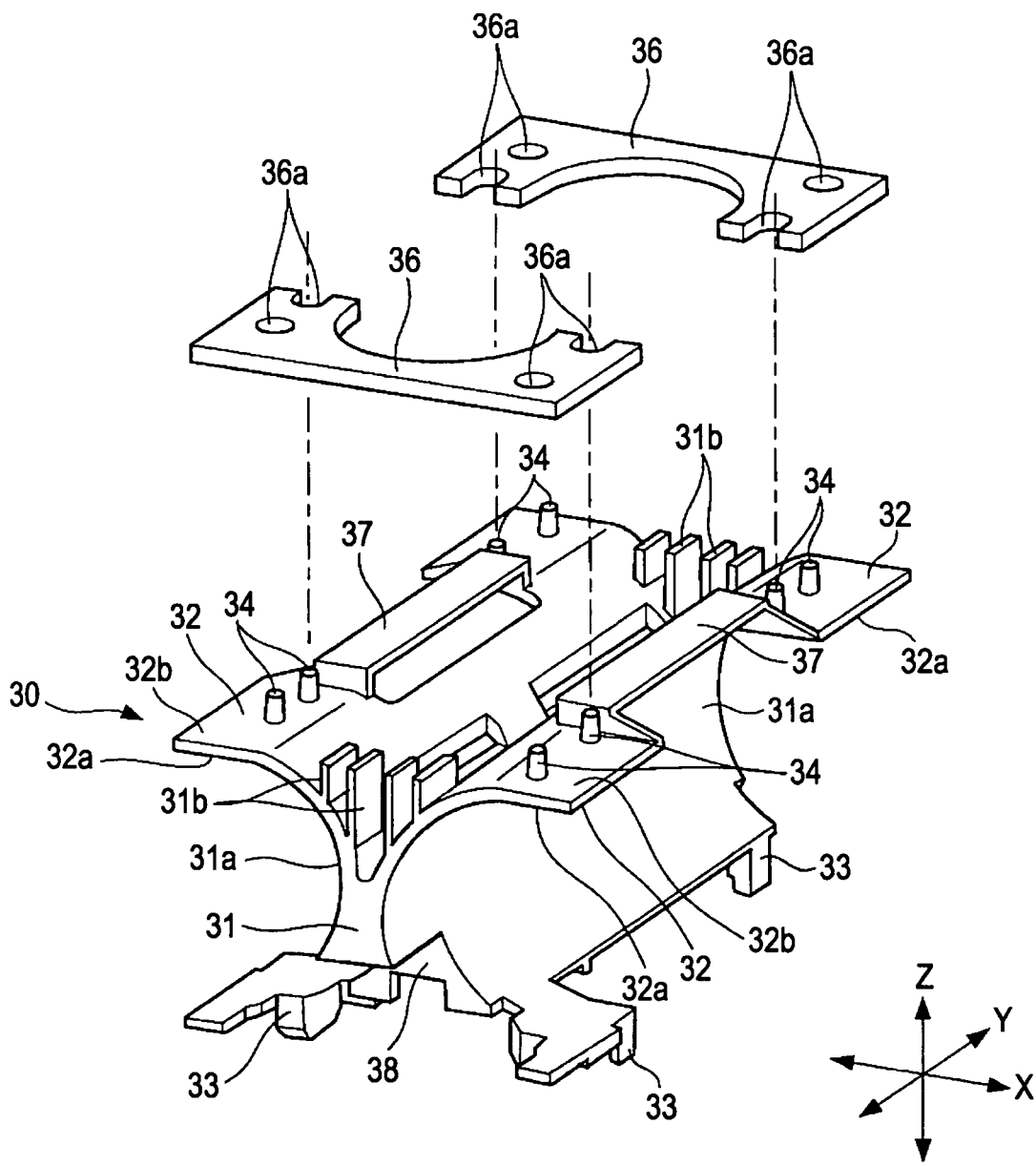
FIG. 5 is an exploded perspective view showing a partition member and a cushion member of the battery pack according to the embodiment of the present invention.
Figure 6:
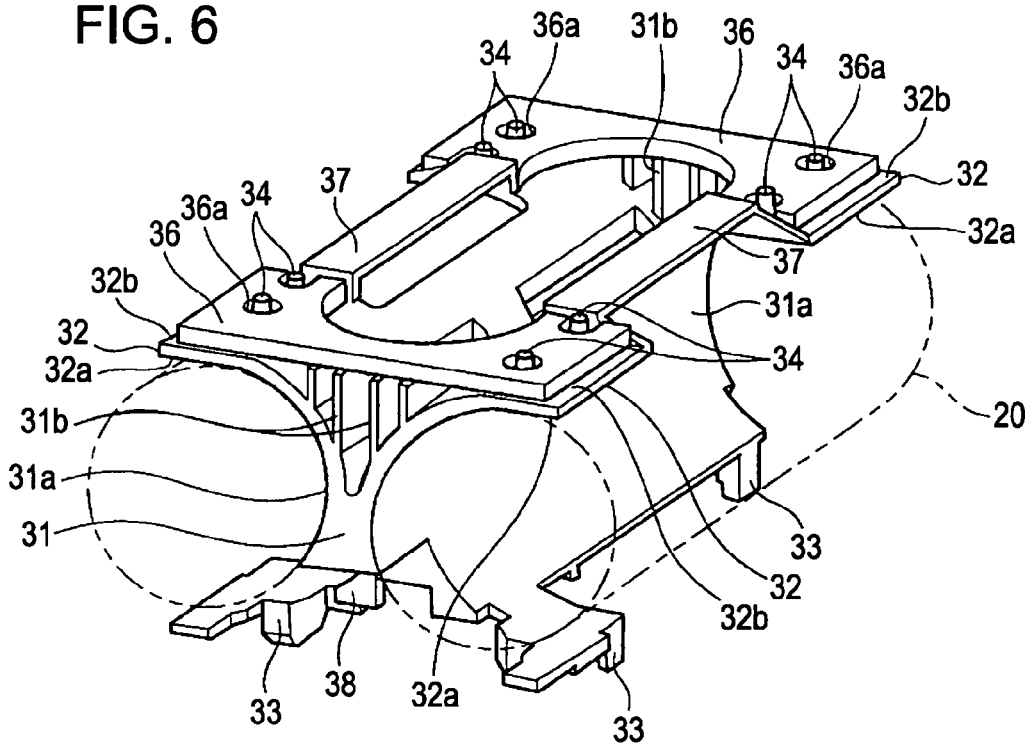
FIG. 6 is a perspective view showing the partition member of the battery pack according to the embodiment of the present invention.
Figure 7:
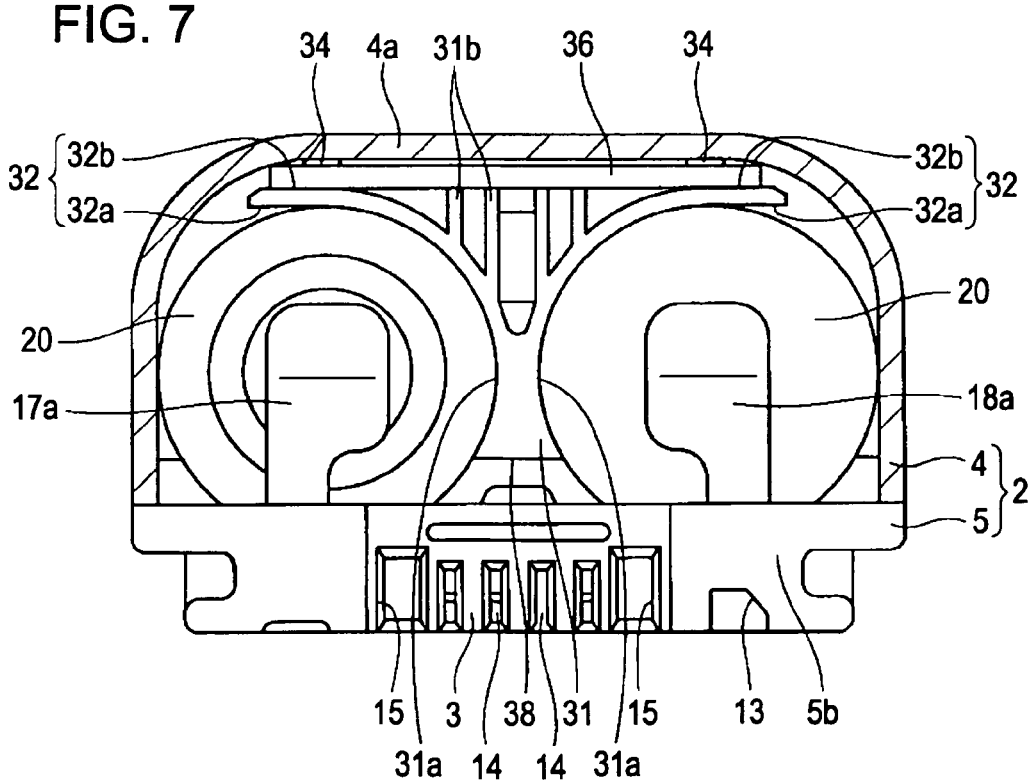
FIG. 7 is a sectional view of the first case of the battery pack according to the embodiment of the present invention, as seen from the front side.
Figure 8:
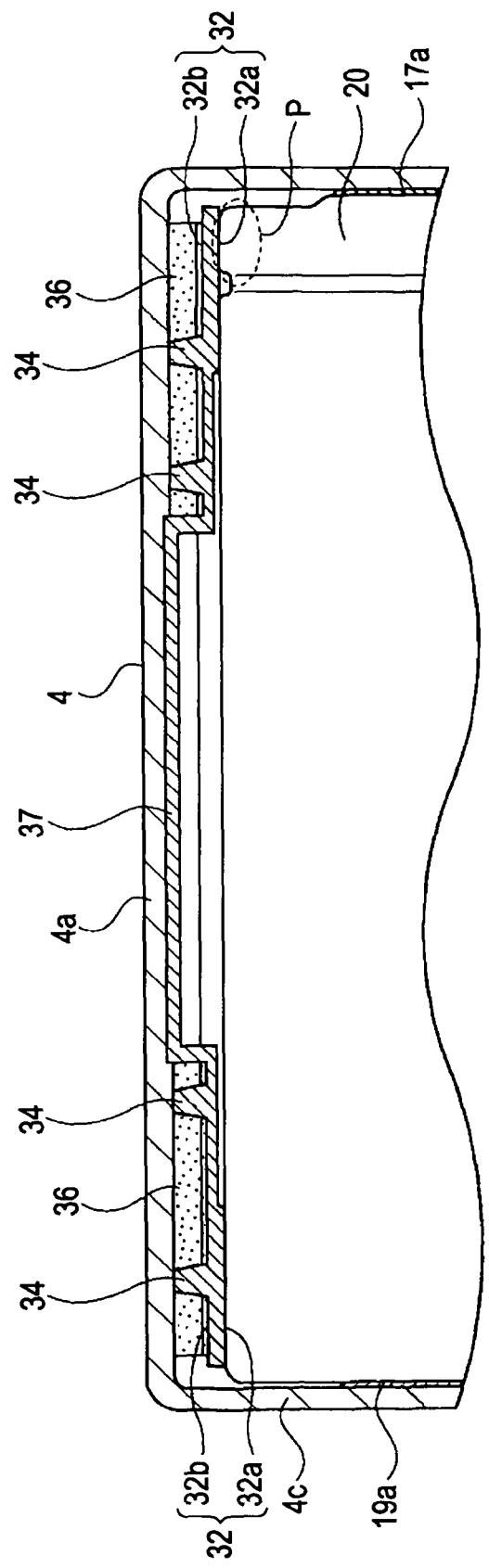
FIG. 8 is a sectional view taken on the line VIII-VIII shown in FIG. 3.

FIGS. 5 and 6 are perspective views showing the partition member 30 according to the present embodiment. FIGS. 7 and 8 are explanatory diagrams showing the cross-section of a principal portion of the battery pack 1 according to the present embodiment.

As shown in FIG. 5, the partition member 30 is formed substantially in the shape of the letter H, and is set so that the length thereof in the longitudinal direction Y is nearly equal to that of the battery cell 20. The partition member 30 has a partition part 31, a shock-absorbing part 32 absorbing external impact, and a leg part 33.

As shown in FIG. 7, the partition part 31 holds the two battery cells 20, and partitions the internal space in the battery housing 2 into spaces, one for each of the battery cells 20. Back in FIG. 5, the partition part 31 has two partition faces 31a. The two partition faces 31a are each formed substantially in the shape of an arc, and have an opening on both sides in the width direction X. As shown in FIG. 6, the diameter of each of the two partition faces 31a is set so as to be nearly equal to the diameter of the battery cell 20. In addition, by making the partition faces 31a hold the battery cells 20, it is possible to prevent the two battery cells 20 from moving in the battery housing 2. Moreover, on one side of the partition part 31 in the height direction Z, four shock-absorbing parts 32 are provided continuously from the partition faces 31a.

The shape of the partition face 31a of the partition part 31 is not limited to the shape of an arc, and is set as appropriate according to the shape of the battery cell 20. For example, when the battery cell 20 is formed in the shape of a hexagon, the shape of the partition face 31a is formed in the shape of a hexagon corresponding to the shape of the battery cell 20.

The four shock-absorbing parts 32 are each formed substantially in the shape of a flat plate, and each have a contact face 32a which is in surface contact with a side face of the battery cell 20 and a placement face 32b which is a face opposite to the contact face 32a. On the placement face 32b of the shock-absorbing part 32, a plurality of protrusions 34 are provided. The plurality of protrusions 34 protrude from the placement face 32b of the shock-absorbing part 32 toward one side in the height direction Z. In addition, of the four shock-absorbing parts 32, two shock-absorbing parts 32 provided along the longitudinal direction Y at predetermined intervals are coupled by a coupling part 37.

Moreover, as shown in FIG. 8, the plurality of protrusions 34 are disposed in an area other than an area P where the cell lid 23 of the battery cell 20 is squeezed into the cell can 22 of the battery cell 20, that is, an area where the positive electrode part and the negative electrode part are located close to each other. As described above, in the present embodiment, the external impact is prevented from being input in an area of the battery cell 20, the area where a short-circuit is most likely to occur. As a result, the battery cell 20 can be effectively prevented from short-circuiting due to the external impact.

Furthermore, on the placement face 32b of the shock-absorbing part 32, a cushion member 36 having elasticity is placed. The cushion member 36 is formed substantially in the shape of a flat plate having an arc-shaped notch. In the cushion member 36, through-holes 36a are provided in positions corresponding to the plurality of protrusions 34 provided on the placement face 32b of the shock-absorbing part 32. The cushion member 36 is placed on the placement face 32b of the shock-absorbing part 32 with the protrusions 34 placed through the through-holes 36a. The thickness of the cushion member 36 is set so as to be slightly smaller than the height of the protrusion 34. In addition, the cushion member 36 is integrally fixed to the placement face 32b by using an adhesive (see FIG. 6).

Here, the partition part 31 is formed in a shape corresponding to the shape of the battery cell 20 to prevent the movement of the battery cell 20. Accordingly, a hollow is formed between the two partition faces 31a of the partition part 31. Therefore, in the present embodiment, between the two partition faces 31a of the partition part 31, a plurality of convex parts 31b protruding to a level nearly equal to the level of the placement face 32b of the shock-absorbing part 32 are provided. This makes it possible to attach the cushion member 36 with stability.

As the material of the cushion member 36, a material having elasticity, such as rubber sponge, polyurethane foam, or polyethylene foam, can be used.

As shown in FIGS. 7 and 8, the shock-absorbing parts 32 and the cushion members 36 are placed between the battery cells 20 and the top face part 4a of the first case 4 when the battery cells 20 and the partition member 30 are housed in the battery housing 2. At this time, the plurality of protrusions 34 provided on the placement faces 32b of the shock-absorbing parts 32 come into contact with the inner wall of the top face part 4a of the first case 4. This creates a space between the battery cells 20 and the top face part 4a of the first case 4. As a result, it is possible to prevent the impact from the battery housing 2 from being directly transferred to the battery cells 20.

Furthermore, when impact which is so strong as to deform the battery housing 2 is exerted on the battery pack 1, the plurality of protrusions 34 are crushed, whereby it is possible to alleviate the impact to be exerted on the battery cells 20. This makes it possible to prevent the battery cells 20 from getting damaged and causing a liquid leak or a short-circuit. Moreover, the shock-absorbing parts 32 and the battery cells 20 are in surface contact with each other on the contact faces 32a. This makes it possible to disperse the impact transferred from the shock-absorbing parts 32 to the battery cells 20, and thereby reduce a load to be put on the battery cells 20.

Moreover, between the shock-absorbing parts 32 and the battery housing 2, the cushion members 36 having elasticity are provided. This makes it possible to absorb the external impact by elastic deformation of the cushion members 36. As a result, it is possible to protect the battery cells 20 more safely.

Back in FIGS. 5 and 6, the leg parts 33 are provided continuously from the other side of the partition part 31 in the height direction Z. The leg parts 33 protrude from the partition faces 31a toward the other side in the height direction Z. In addition, by placing the leg parts 33 on the mounting part 10 of the second case 5, the partition member 30 is mounted on the mounting part 10 of the second case 5. Between the leg parts 33 and the mounting part 10 of the second case 5, the control circuit board 16 is provided.

Furthermore, the partition member 30 is provided with a notch part 38 which is cut continuously from the partition part 31 to the leg parts 33. As shown in FIGS. 3 and 7, the notch part 38 prevents the partition member 30 from coming into contact with the output terminal 3 when the partition member 30 is mounted on the mounting part 10 of the second case 5.

In the present embodiment, an example in which the partition part 31 and the shock-absorbing part 32 are integrally formed as the partition member 30; however, the embodiment of the present invention is not limited to such an example. For example, the partition part 31 and the shock-absorbing part 32 may be formed as separate members.

Figure 9:
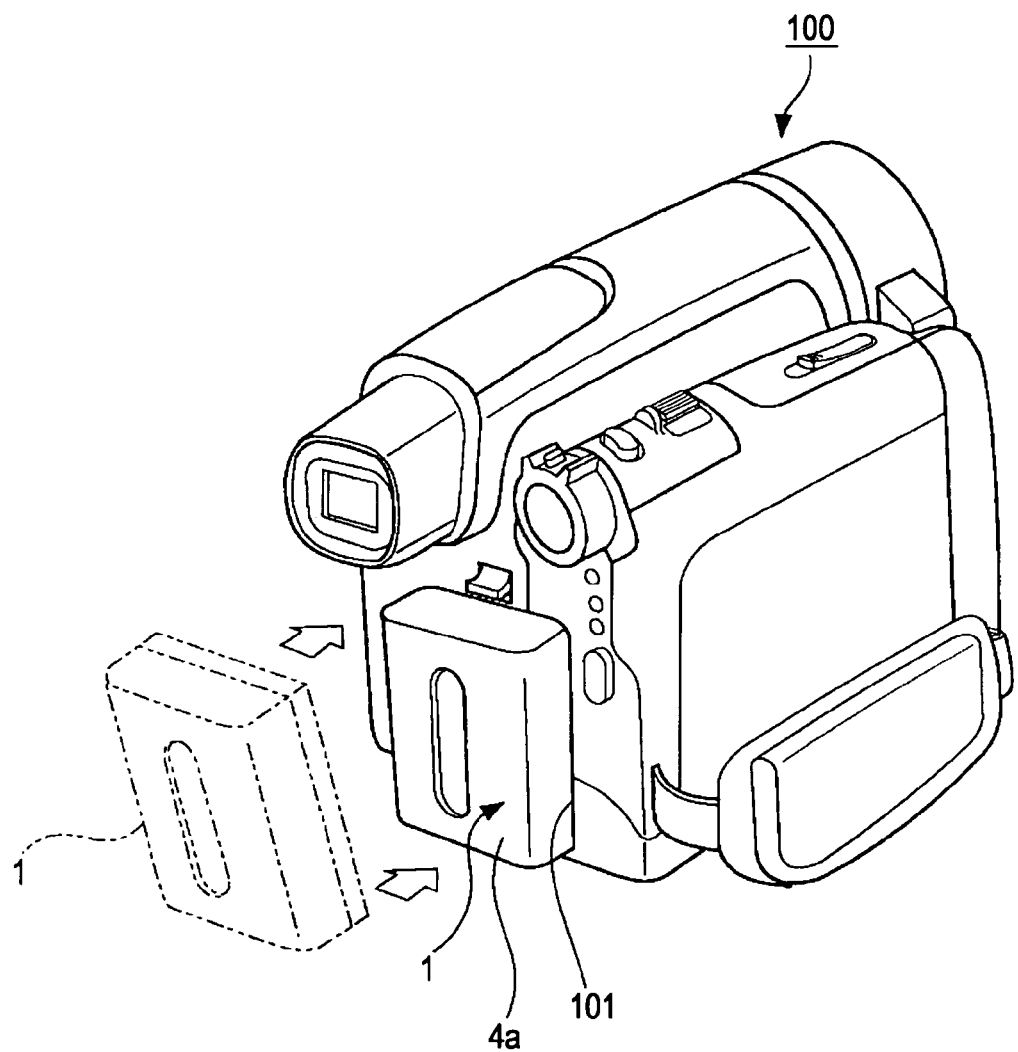
FIG. 9 is a perspective view when the battery pack according to an embodiment of the present invention is attached to an electronic apparatus.

As shown in FIG. 9, the battery pack 1 having the structure described above is detachably attached to an attachment part 101 disposed on the back face of an imaging device 100 used as a specific example of an electronic apparatus. As a result, when the imaging device 100 is dropped to the ground with the front or side face down, the impact is alleviated by the imaging device 100, preventing too strong impact from being exerted on the battery pack 1. However, when the imaging device 100 is dropped to the ground with the back face down, strong impact is exerted on the top face part 4a or the chamfered part 4f of the first case 4 of the battery pack 1. Therefore, in the present embodiment, the battery cells 20 are effectively protected by disposing the shock-absorbing parts 32 between the battery cells 20 and the top face part 4a of the first case 4.

[1-4. Assembly of the Battery Pack]

Next, an assembly method of the battery pack 1 having the structure described above will be described.

First, as shown in FIG. 5, the cushion members 36 are fixed to the placement faces 32b of the shock-absorbing parts 32 of the partition member 30 by a fixing method using an adhesive, for example. At this time, by placing the protrusions 34 through the through-holes 36a provided in the cushion members 36, the cushion members 36 can be positioned in place.

Next, as shown in FIG. 6, the two battery cells 20 are placed in the partition part 31 of the partition member 30. Then, the three electrode plates 17, 18, and 19 are fixed to both end faces of the two battery cells 20 by a fixing method such as welding. Specifically, the first electrode piece 17a of the first electrode plate 17 and the first electrode piece 18a of the second electrode plate 18 are fixed to one end faces of the battery cells 20. Furthermore, the two first electrode pieces 19a of the third electrode plate 19 are fixed to the other end faces of the two battery cells 20.

Next, the three electrode plates 17, 18, and 19 are electrically connected to the control circuit board 16. At this time, the control circuit board 16 is disposed under the leg parts 33 of the partition member 30. Furthermore, the control circuit board 16 and an unillustrated battery-side electrode provided in the output terminal 3 are electrically connected. By doing so, it is possible to connect the output terminal 3, the control circuit board 16, and the two battery cells 20 electrically.

Next, the partition member 30 holding the two battery cells 20 is mounted on the mounting part 10 of the second case 5. At this time, the output terminal 3 is embedded in the opening part 5g provided in the second case 5. Moreover, the control circuit board 16 is disposed between the leg parts 33 of the partition member 30 and the mounting part 10 of the second case 5.

Then, as shown in FIG. 3, the partition member 30 holding the two battery cells 20 is inserted into the opening part of the first case 4, and the second case 5 is put on the first case 4 in such a way as to close the opening part of the first case 4. At the portion where the second case 5 is put on the first case 4, the first case 4 and the second case 5 are bonded together. As the bonding method, ultrasonic welding or a bonding method using an adhesive, for example, can be used. Moreover, other bonding methods such as hot welding can be used.

In this way, the assembly of the battery pack 1 is finished. The assembly method of the battery pack 1 is not limited to the assembly method described above; the battery pack 1 may be assembled by other methods. For example, the battery cells 20 may be placed in the partition member 30 after fixing the three electrode plates 17, 18, and 19 to the battery cells 20.

During the bonding, the ends of the protrusions 34 are brought into contact with the inner wall of the top face part 4a of the first case 4 while being crushed to some extent, as shown in FIGS. 7 and 8. This makes it possible to adjust a dimension error in the partition member 30 in the height direction Z by the protrusions 34, and house the partition member 30 and the battery cells 20 in the battery housing 2 without a rattle.

Moreover, the protrusions 34 are set so as to be slightly higher than the thickness of the cushion member 36. This makes it possible to house the cushion members 36 and the partition member 30 in the battery housing 2 while preventing the cushion members 36 from being crushed between the partition member 30 and the battery housing 2.

Furthermore, since the partition part 31 and the shock-absorbing parts 32 are integrated together into a single member, it is possible to reduce the number of parts. Moreover, it is possible to increase the area of the surface of the battery cells 20 covered with the partition member 30, and prevent the battery cells 20 from moving at the time of assembly of the battery pack 1. As a result, in the present embodiment, it is possible to reduce the cost of the battery pack 1 and improve the workability of the assembly of the battery pack 1 at the same time.

<2. Battery Pack According to Another Embodiment>

Next, with reference to FIG. 10, a battery pack 40 according to another embodiment will be described.

Figure 10:
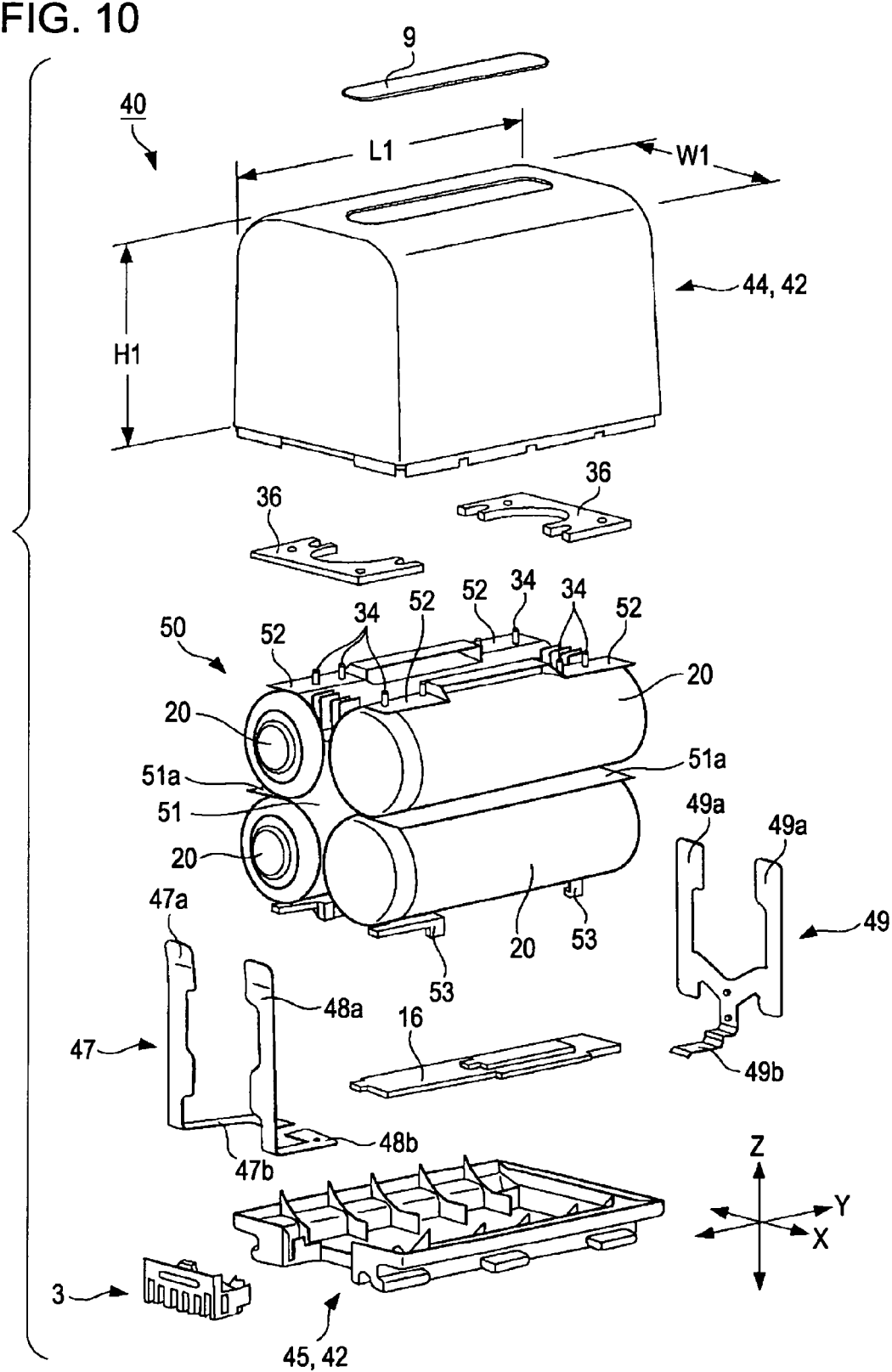
FIG. 10 is an exploded perspective view showing a battery pack according to another embodiment of the present invention.

FIG. 10 is an exploded perspective view of the battery pack 40 according to the other embodiment.

As shown in FIG. 10, the battery pack 40 according to the embodiment is provided with four battery cells 20. The structure of the battery pack 40 according to the embodiment is the same as that of the battery pack 1 according to the embodiment described earlier, except for the shapes of a first case, a partition part, and an electrode plate. Therefore, here, emphasis is placed on a first case, a partition member, and an electrode plate, and such parts as are found also in the battery pack 1 according to the embodiment described earlier are identified with the same reference characters and a duplicate description will be omitted.

As is the case with the embodiment described earlier, the axes of the two battery cells 20 are arranged almost parallel to the longitudinal direction Y, and the battery cells 20 are aligned along the width direction X. In addition, the four battery cells 20 are disposed in such a way that two sets of battery cells 20, each set being made up of two battery cells 20 aligned along the width direction X, are stacked in the height direction Z. The space between the four battery cells 20 is partitioned by a partition member 50 in the width direction X and in the height direction Z.

The partition member 50 has a partition part 51, a shock-absorbing part 52 absorbing external impact, and a leg part 53. Since the shock-absorbing part 52 and the leg part 53 have the same structures as those of the shock-absorbing part 32 and the leg part 33 according to the embodiment described earlier, the descriptions thereof are omitted, and only the partition part 51 will be described.

The partition part 51 is formed substantially in the shape of a cross, and has four partition faces 51a. The four partition faces 51a are each formed substantially in the shape of an arc, and are set so as to have a diameter nearly equal to the diameter of the battery cell 20. In addition, by making the partition faces 51a hold the four battery cells 20, it is possible to prevent the four battery cells 20 from moving in a battery housing 42.

The battery housing 42 is made up of a first case 44 and a second case 45 having the same structure as that of the second case 5 according to the embodiment described earlier. The first case 44 is formed in the shape of a container having an opening part on one face, and the dimensions thereof are set such that length L1>height H1>width W1 holds.

Moreover, to the four battery cells 20, three electrode plates 47, 48, and 49 are electrically connected. The first electrode plate 47 and the second electrode plate 48 are each formed substantially in the shape of the letter L and are formed in a symmetrical shape. The first electrode plate 47 has a first electrode piece 47a coming into contact with one end faces of the two battery cells 20 arranged in the height direction Z and a second electrode piece 47b electrically connected to the control circuit board 16. Similarly, the second electrode plate 48 has a first electrode piece 48a coming into contact with one end faces of the two battery cells 20 arranged in the height direction Z and a second electrode piece 48b electrically connected to the control circuit board 16.

The third electrode plate 49 is formed substantially in the shape of the letter Y. The third electrode plate 49 has two first electrode pieces 49a and a second electrode piece 49b continuously formed almost perpendicularly from the two first electrode pieces 49a. The two first electrode pieces 49a come into contact with the other end faces of the two battery cells 20 arranged in the height direction Z.

Since other structures are the same as those of the battery pack 1 according to the embodiment described earlier, the descriptions thereof are omitted. With the battery pack 40 having the structure described above, it is possible to obtain the same workings and benefits as those of the battery pack 1 according to the embodiment described earlier.

It is to be understood that the present invention is not limited to the embodiments described above and illustrated in the drawings, and various modifications are possible within the scope of the embodiments of the present invention. For example, the embodiments described above deal with cases where an imaging device is taken up as an example of an electronic apparatus to which a battery pack is attached; however, these embodiments of the present invention are not limited to such cases. The battery pack according to an embodiment of the present invention can be attached, for example, to an electronic still camera, a personal computer, an electronic dictionary, a DVD player, a car navigation system, and various other types of electronic apparatuses.

Moreover, an example in which six right and left engaging pieces are provided in the battery pack has been described. However, the number of engaging pieces is not limited to six, and five or less engaging pieces or seven or more engaging pieces may be provided. In order to attach the battery pack to an electronic apparatus in a balanced manner, it is preferable that the engaging pieces be provided in such a way that they are the same in number on the right and left sides. Furthermore, the number of battery cells forming the battery pack is not limited to two or four. For example, one, three, or five or more battery cells may be provided.

Furthermore, a protrusion acting as a shock-absorbing part may be provided on the inner wall of a battery housing. Moreover, although the embodiments described above deal with cases where a cushion member is attached to a shock-absorbing part, the cushion member may be attached to the inside of the battery housing.

It should be understood by those skilled in the art that various modifications, combinations, sub-combinations and alterations may occur depending on design requirements and other factors insofar as they are within the scope of the appended claims or the equivalents thereof.

What is claimed is:

1. A battery pack comprising:
a battery housing;
a battery cell having a tubular negative electrode having an opening part at one end and a positive electrode fixed to the tubular negative electrode in such a way as to close the opening part, the battery cell being housed in the battery housing;
one or more protrusions disposed between the battery cell and an inner wall of the battery housing on an area of a surface of a shock-absorbing part, wherein the area is other than an area where the positive electrode and the tubular negative electrode of the battery cell are fixed; and an elastic cushion member disposed on the surface, with through-holes provided in positions corresponding to the one or more protrusions.

2. The battery pack according to claim 1, wherein the shock-absorbing part is provided between the battery cell and the one or more protrusions in such a way as to be in contact with the battery cell.

3. The battery pack according to claim 2, wherein the one or more protrusions protrude toward the inner wall of the battery housing.

4. The battery pack according to claim 2, further comprising:
 a plurality of battery cells in the battery housing; and
 a partition part that partitions a space in the battery housing into spaces for respective battery cells, wherein the shock-absorbing part is formed integrally with the partition part.

5. The battery pack according to claim 1, wherein the one or more protrusions are disposed on an inside face of the battery housing, the inside face being opposite to another face coming into contact with an electronic apparatus when the battery pack is attached to the electronic apparatus.

6. The battery pack according to claim 1, wherein the one or more protrusions disperse force due to external impact to the battery cell.

7. The battery pack according to claim 1, wherein the one or more protrusions are collapsed when a force strong enough to deform the battery housing is exerted on the battery pack.

* * * * *